Patented May 29, 1923.

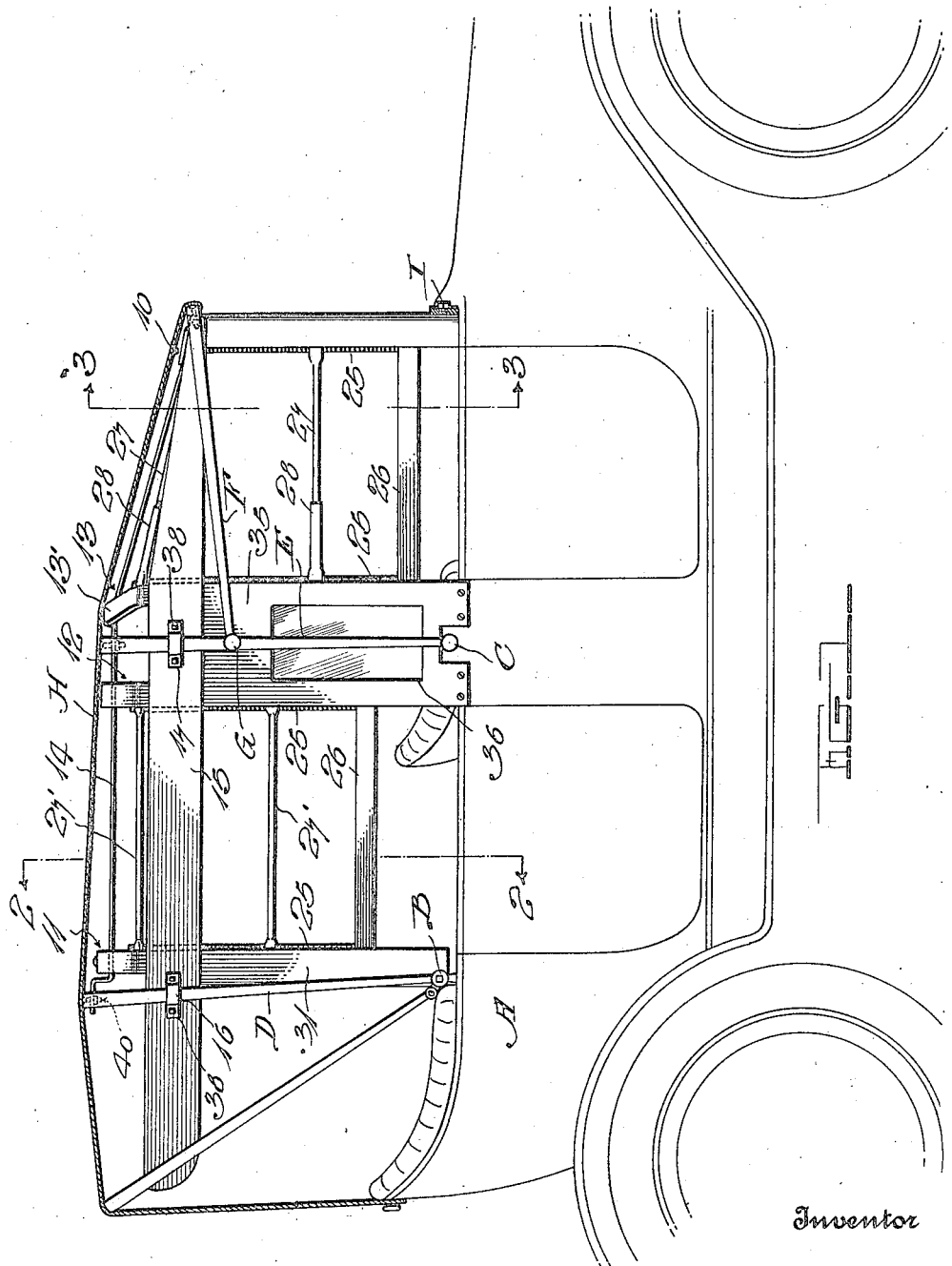

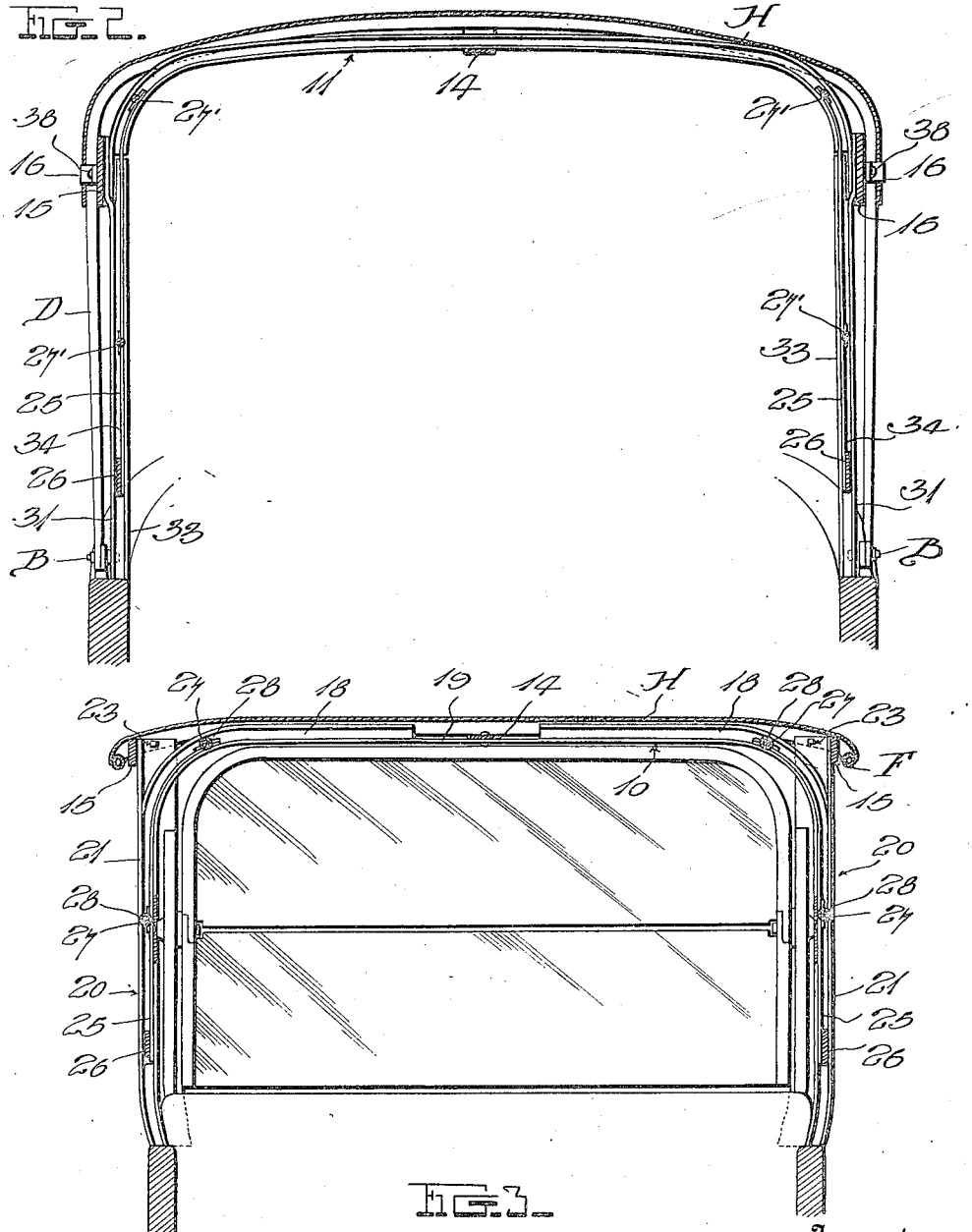

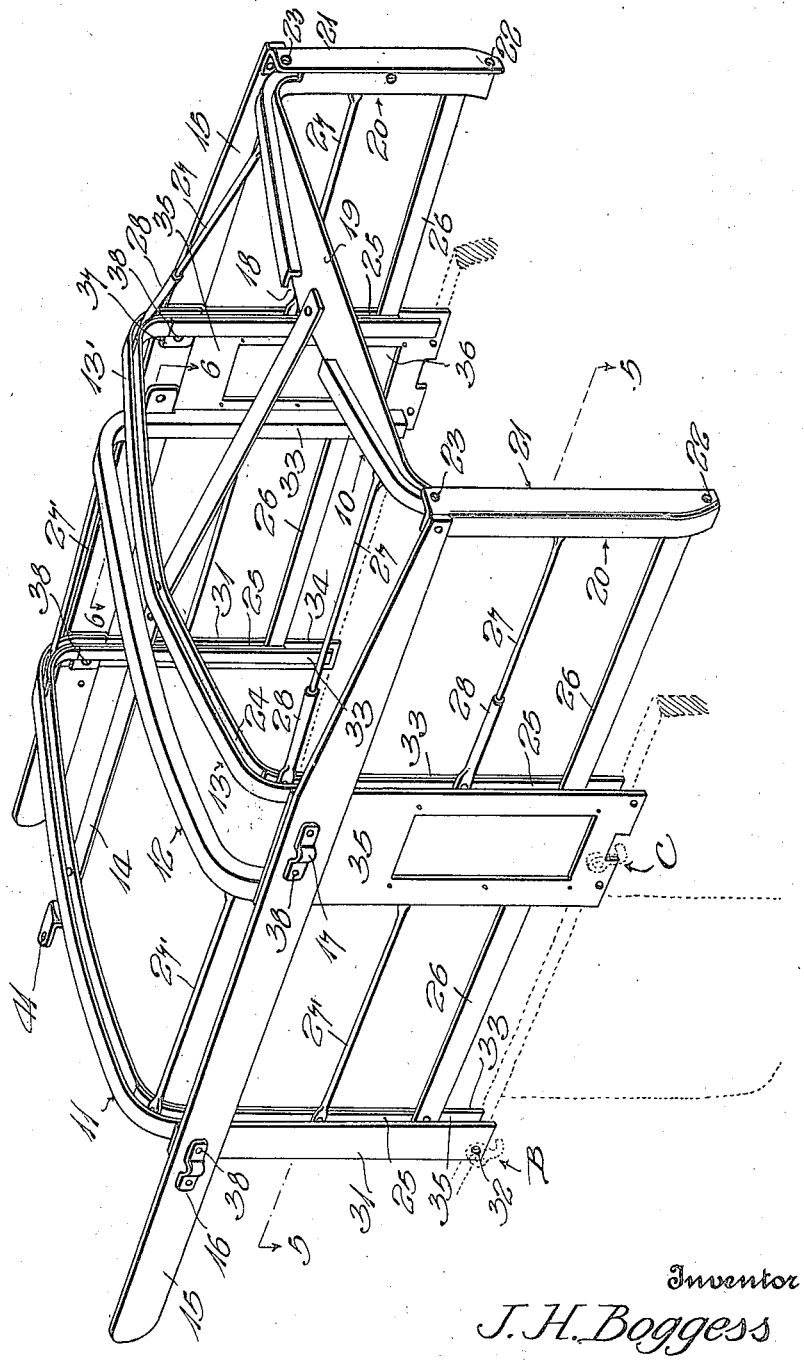

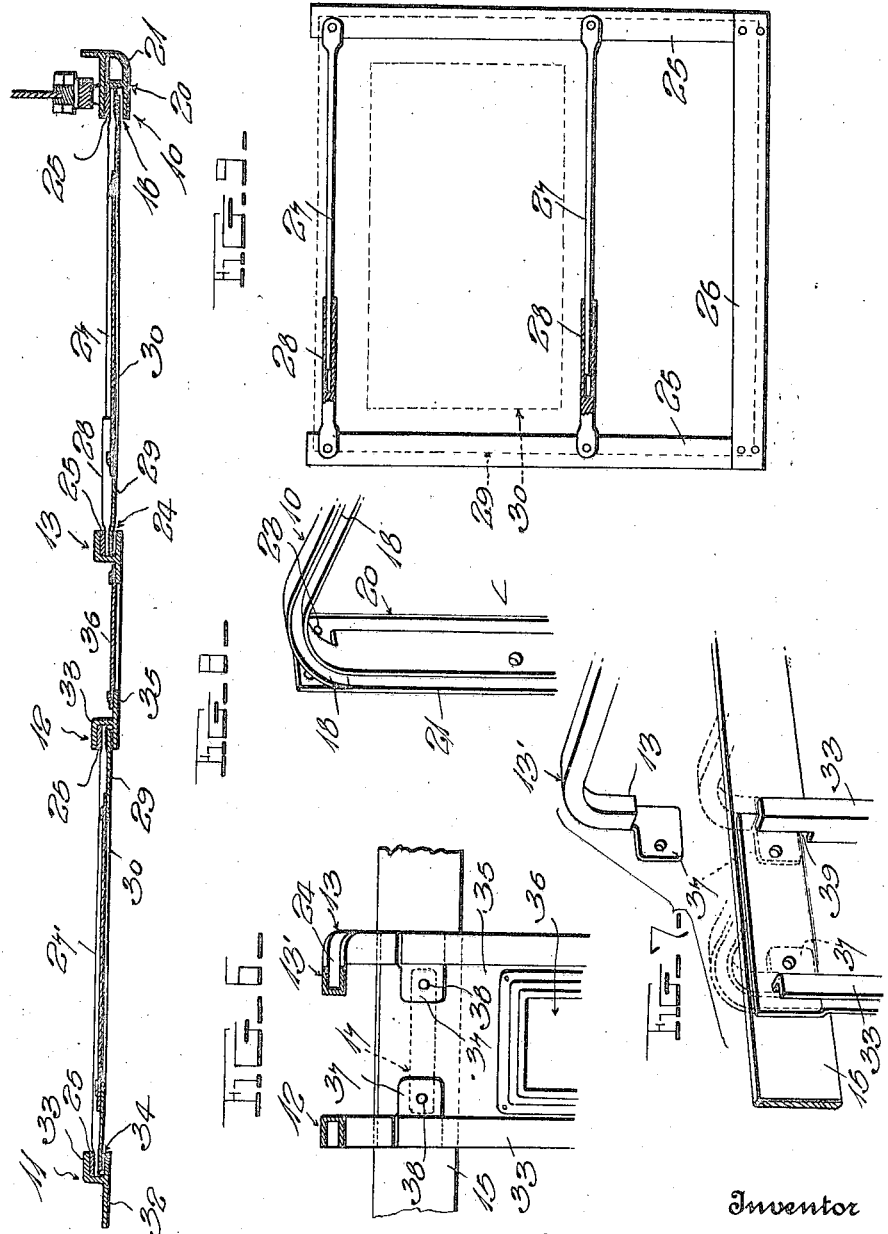

1,456,669

UNITED STATES PATENT OFFICE.

JAMES H. BOGGESS, OF FOND DU LAC, WISCONSIN, ASSIGNOR TO LONGDIN-BRUGGER COMPANY, OF FOND DU LAC, WISCONSIN, A CORPORATION.

CURTAIN-CARRYING ATTACHMENT FOR VEHICLES.

Application filed May 19, 1919. Serial No. 298,172.

*To all whom it may concern:*

Be it known that I, JAMES H. BOGGESS, a citizen of the United States, residing at Fond du Lac, in the county of Fond du Lac and State of Wisconsin, have invented certain new and useful Improvements in Curtain-Carrying Attachments for Vehicles; and I do declare the following to be a full, clear, and exact description of the invention, such as will enable others skilled in the art to which it appertains to make and use the same.

This invention relates to vehicle tops, and it relates more specifically to a curtain carrying attachment for automobiles or other vehicles.

One object of this invention is to provide an improved curtain carrying attachment which may be quickly and easily fitted to a Ford automobile or similar vehicle without marring or materially changing any part of the body or top of the automobile.

A further object is to provide an attachment of this character which may be quickly and easily built up under the automobile's canopy while the latter remains on the body of the automobile.

A further object is to provide an improved curtain frame which is especially applicable for sliding engagement in a distorted guide which extends across the downwardly inclined front end of the automobile's top.

Other objects and advantages may become apparent to persons who read the following details of description in connection with the accompanying drawings in which:

Figure 1 is a side view of a Ford-pattern automobile, the body and wheels being diagrammatically indicated in elevation, and the top thereof being shown in section; my improved attachment being shown in side elevation in its useful position within the ordinary Ford automobile top.

Fig. 2 is a transverse sectional view through the top and attachment, the section being taken along the line 2—2 of Fig. 1.

Fig. 3 is a transverse sectional view through the top end attachment, the section being taken along the line 3—3 of Fig. 1.

Fig. 4 is a perspective view showing my improved attachment separated from the usual top of the automobile, but showing the connections of this attachment with the body of the automobile, the body and connections being shown in dotted lines.

Fig. 5 is a horizontal sectional view, the section being taken along the line 5—5 of Fig. 4.

Fig. 6 is a longitudinal vertical sectional view, the section being taken along the line 6—6 of Fig. 4.

Fig. 7 is a perspective view illustrating the details of construction of the curtain guides.

Fig. 8 is a perspective view illustrating the upper left hand corner of the curtain supporting frame as viewed from the rear.

Fig. 9 is a side view, partly in section, of one of my improved curtain-frames or carriers, the curtain being indicated in dotted lines, the inner quadrangle in dotted lines representing a window in the curtain.

Referring to these drawings in detail in which similar reference characters correspond with similar parts throughout the several views, and in which the body and wheels of the automobile are shown merely to show at a glance the application of the invention,—

The invention consists in the details of construction of the attachment, and the combination of this attachment with the body and top of an automobile of well known construction. However, a brief description of this ordinary automobile body and top will be given for the purpose of giving a full and clear understanding of the relation of my invention thereto. The body A is provided with pivotal supports B and C for the rear and intermediate bows D and E respectively, of the automobile top, and the front bow F is pivotally supported at G to the intermediate bow E. In referring to the bow E hereinafter as the intermediate bow, it is to be understood that it is intermediate in the sense that it is connected to the intermediate portion of the body and that its top or bridge which supports the canopy H is intermediate of the similar portions of the bows D and F.

The letter I indicates a bolt or stud by which the lamp bracket is supported. It will be understood, of course, that the automobile is provided with two of each of the elements B, C, G. and I.

Referring now more particularly to Figures 4 to 8 inclusive, it will be seen that the curtain supporting attachment comprises a front bow 10, a rear bow 11, a pair of intermediate bows 12 and 13, a top bar or strut 14 and a pair of side bars 15, the latter being preferably of wood or other relatively light and rigid material, while the elements 10 to 14 inclusive are preferably of iron or steel. The members or bars 14 and 15 are secured to each of the bows 10 to 13 and hold them in rigid relation to one another. Moreover, the bars 15 are each provided with clamping plates 16 and 17 which hold these bars and intermediate bows D and E, respectively, in rigid relation.

The bows 10 and 13 constitute a front guide for the curtain frame which is illustrated separately in Fig. 9, each of these bows having a channel extending throughout its length, with the exception that the middle portion of the channel in the front bow is preferably cut away or omitted for a purpose which will hereinafter appear. Referring now especially to Figs. 4, 5 and 8, it will be seen that the front bow comprises a channel 18 which extends from the automobile body to the middle portion of a plate or bridge element 19 to which the strut 14 has its front end secured. The plate 19 is widened at its middle portion for the purpose of adding strength at this portion, but more particularly to provide a seat or support for the channel 18 which has its bridge portion rearwardly and inwardly inclined for a purpose explained hereinafter. The upright portions 20 of the bow 10 comprise plates 21 of right angular shape in cross section having apertures 22 at their lower ends to receive the lamp bolts I, while the upper ends of these plates are apertured at 23 to receive a bolt or other securing means whereby the front bow F is secured thereto.

The bow 13 is higher than the bow 10 for the purpose of conforming to the forwardly inclined portion of the canopy H, and therefore, the bridge portion of this bow 13 is bent at its middle portion so that the halves of the bridge are inclined rearwardly and inwardly, the inclination being substantially the same as that of the similar halves of the bridge portion 19 of the front bow. The bow 13 is formed with a channel 24 which extends throughout its length, and this channel and the channel 18 form a guide or guides for the front curtain frames which will now be described in detail, referring to Figs. 4, 5 and 9.

There are two of the curtain frames such as illustrated in Fig. 9, and each comprises a pair of spring metal strips 25 having one of their ends rigidly secured to a metal strip or bar 26, the other ends and intermediate portions of the spaced strips 25 being connected by means of torsionally adjustable struts, each of these struts comprising a rod 27 and a socket 28, one end of each rod 27 being turnably seated in the contiguous socket 28. A curtain 29 is secured to the curtain-frame by any appropriate means and a window 30 is preferably provided in each curtain 29. The curtain 29 and window 30 may be of any appropriate flexible material, and the strips 25 are quite flexible, so that the window frame and curtain may be flexed or bent so as to conform to the curvatures of the bows, it being understood that the flexible strips 25 are seated longitudinally in the grooves or channels of the curtain supporting bows.

It has been explained that the bridge portions of the bows are inclined rearward and inward, so that the curtain frame guide which they constitute is distorted, and it will be seen, therefore, that as either of the front curtain frames is slid upward in the vertical portions of the bows, and its upper end enters the curved portions, the front strip 25 is bent or curved at a point at a lower level than that at which the rear one of the strips 25 is bent, and therefore, if the bridge portions of these bows extended straight across the frame, the tendency would be to destroy the right angle-relation of the struts which comprise the elements 27 and 28, thereby distorting and probably tearing the curtain. The supporting of the front curtain guides in the manner shown permits the struts of the curtain frame to remain substantially at right angles to the strips 25, and thus avoids injury to the curtain carried thereby. Moreover, since the front strip begins to bend in advance of the rear strip of the front curtain frames, a torsion is effected in the struts of the front frames, and the turnable connection of the rods 27 with the sockets 28 permits a torsional self-adjustment of these struts.

The rear curtain-guiding bow 11 has a pair of upright plates or bars 31, which are supported by the rear pivotal connections B, the latter extending through apertures 32 in the bars 31. The bars 31 are provided with L-beams 33 (see Figs. 4 and 5) which are welded or otherwise secured to the plates 31 so as to form upright channels 34 in which the rear strips 25 of the rear curtain frames slide. The front strips 25 of the rear curtain frames slide in grooves or channels which are formed by similar L-beams 33. These L-beams 33 are united with the plates 35 which have windows 36 therein and which have second L-beams 33 united with their front edge portions. These second L-beams form elements of the bow 13, while the rear L-beams on the plates 35 form elements of the bow 12.

From the foregoing, in connection with the drawings, it is evident that each of the bows 11, 12 and 13 is formed of separable parts, viz., upright parts and a substantially horizontal or bridge element. It will now be shown that the horizontal parts of the bows are attached to the plates 31 and 35 so that their channels are alined respectively.

Referring especially to Figs. 4 and 7, it will be seen that the bow 13 comprises a bridge portion 13' which is formed of a channel beam having its end portions slitted transversely through its web and one of its flanges to form attaching ears 37. These attaching ears 37 are apertured to receive bolts 38 which extend through the adjacent bars 15 and clamping plates 17. The upright portions 33 of the bow 13, comprising sections of L-beam as previously described, have one of their flanges narrowed by the removal of portions at the upper ends thereof, as illustrated at 39, and it is the remaining portions of this flange which are united with the plates 35. Slots are thereby provided in the upper ends of the uprights 33, and these slots receive the attaching ears 37 of the ends of the bridge portion 13', so that when the latter is moved from the full line position shown in Fig. 7 to the dotted line position therein, the channel of the bridge portion is alined with that of the upright portions of this bow. The description of this connection of the bow 13 applies also to the bows 11 and 12.

From the foregoing description, it will be seen that the bolts 38 that extend through the ears 37 of the bows 12 and 13 also extend through the adjacent bars 15 and the clamps 17 which are seated thereon. The object of the clamps 17 is to engage with the intermediate bow E, and it will be seen that the bolts 38 cooperate with the clamps 17 for clamping this intermediate bow of the automobile top, thereby holding the attachment and bow E in rigid relation to one another. Likewise the clamps 16 and bolts 38 which connect them with the plates 31 and bars 15 cooperate with the clamping plates 16 to clamp the rear bow D.

It will be seen that the bows 11 and 12 are substantially of the same shape and extent, and that the rods 27' which form elements of the curtain frames which slide in these bows are not provided with sockets 28, as no torsion occurs with these rods.

The middle portion of the rear bow D is secured to the rear end of the strut 14 by means of a bolt 40 extending through an aperture 41.

The pivots of the automobile's wind-shield may be extended through and secured in apertures in the front bow portions 20, as shown in Figs. 3, 4, 5 and 8.

The purpose of the bars 15 is not only to strengthen the frame and make it rigid, but also to prevent contact of the canopy with the curtain frames as while being raised and lowered.

The cut out portion of the front channel 18 permits the flexible front curtain-frames to overlap when desirable to raise these frames entirely out of communication with the openings below the bars 15.

The lower ends of the plates 21 are curved inward for pressing the curtain frames inward against the automobile's body so as to exclude wind at that part.

This invention is not limited to the exact details and arrangement as described and shown, but changes may be made without departing from the inventive ideas as described and claimed herein.

What I claim as my invention is:

1. A vehicle top including an arched frame, curtain frame guideways supported by said arched frame, said guideways extending upwardly, along one side of said arched frame and then curving inwardly at different heights to extend across the top portion of the latter, and a flexible curtain slidable in said guideways, said curtain comprising two spaced flexible strips which are slidable in said guideways, and transverse struts connecting said strips, the transverse strut at the upper edge of the frame of said curtain being readily adjustable torsionally to prevent binding of the upper edge of said curtain as it passes around the curved portions of said guideways.

2. A frame for a flexible curtain comprising a pair of spaced springy strips, and a transverse strut connecting said strips, one of said struts consisting of a pair of members, one of said members being rigidly secured to each of said strips, said members being arranged in longitudinal alinement and having their adjacent ends turnably engaged.

3. A curtain frame comprising two flexible springy strips, a rigid strut having its ends rigidly united with said flexible strips, and a torsionally adjustable strut having its ends secured to said flexible strips, said strut comprising a socket and a rod having one end turnably mounted in said socket.

4. In a curtain carrying frame of the character described, a plate adapted for attachment in upright position to the side of an automobile body, an L-beam secured along the edge of one of its sides to said plate to provide an upright channel between its other side and said plate, the upper extremity of the first mentioned side of said L-beam being narrowed to provide a slot in open communication with said channel, a longitudinally curved channel beam having the extremity of one of its flanges and its web bent to extend in the opposite direction from its other flange to provide an attaching ear, said channel beam being disposed with its channel in alinement with the aforesaid channel and with said ear engaging in said slot, and a securing element extending through said ear and said plate and securing said channel beam to the latter.

5. The combination of a plurality of structures as specified in claim 4, and a horizontal bar secured to the plates of such structures by the securing elements which secure the channel beams to the plates.

6. In a curtain carrying frame of the character described, a plate adapted for attachment in upright position to the side of an automobile body, L-beams secured along the edges of one of their sides to the edge portions of said plate to provide oppositely facing channels between their other sides and said plate, the upper extremities of the first mentioned sides of said L-beams being narrowed to provide slots in open communication with said channels, longitudinally curved channel beams having the extremities of one of their flanges and the webs bent to extend in opposite directions from their other flanges to provide attaching ears, said channel beams being disposed with their channels in alinement with the aforesaid channels and with said ears engaging in said slots, a horizontal bar extending across the upper extremity of said plate, a strap disposed on said bar for engagement with a bow of an automobile top, and securing elements extending through said ears, plate, bar and strap and securing these parts together.

7. A sliding curtain carrying attachment for automobiles comprising an arched frame having a top portion for disposition beneath the top of the automobile and side portions for disposition at the sides of the automobile; said frame including front, rear and intermediate bows having substantially horizontal portions adapted to extend transversely across the top of the automobile and upright portions for disposition at the sides of the automobile, the horizontal portions of said bows being made as separate sections from the upright portions thereof and being detachably secured at their extremities to the upper extremities of the latter, side bars for disposition along the side edges of the automobile top detachably secured to the upper extremities of the upright portions of said bows, a strut extending longitudinally of the top portion of said frame between the side portions thereof, said strut being detachably secured to the horizontal portions of said bows, the rear extremity of said strut being adapted for attachment to the horizontal portion of one of the rear bows of the automobile top, means carried by said side bars for engagement with upright portions of a bow of the automobile top, the lower extremities of the upright portions of the bows of said frame being adapted for attachment to the sides of the automobile, guideways carried by the bows of said frame, and flexible curtains slidable in said guideways.

8. In a vehicle top, a relatively low bow having a curtain-guide extending therealong, a relatively high bow having a curtain-guide extending therealong, a flexible curtain mounted for movement along the curtain guides of said low and high bows, the bridge of each bow being rearwardly inclined from the upright portions to the middle portion thereof, and a curtain-frame carrying said curtain, said curtain frame comprising two flexible strips, a rigid strut rigidly secured to said flexible strips, and two strut-forming members each having one end secured to one of said flexible strips, the other ends of these strut-forming members being connected together for relative rotary movement about their longitudinal axis.

9. The combination with a vehicle having a top which comprises front, rear and intermediate bows, and pivoted supports for these bows, of a curtain-supporting structure secured to and supported by said pivotal supports of the vehicle top, said structure comprising a plurality of curtain-guiding bows, a strut securing the tops of the curtain-guiding bows in fixed relation to one another and being secured to one of the bows of said vehicle top, the front end of said structure being secured to the front bow of the vehicle top, and a pair of bars at opposite sides of said structure, said bars being fitted between the upper portions of the vehicle bows and the corresponding portions of said curtain-supporting structure and being secured to the latter and to the bows of said vehicle top.

In testimony whereof I have hereunto set my hand.

JAMES H. BOGGESS.